(12) United States Patent
Slaughter et al.

(10) Patent No.: US 7,570,600 B1
(45) Date of Patent: Aug. 4, 2009

(54) OVERLAY NETWORK WITH EFFICIENT ROUTING AND RECOVERY

(75) Inventors: Gregory L. Slaughter, Palo Alto, CA (US); Thomas E. Saulpaugh, San Jose, CA (US); Mark P. Kwiatkowski, San Jose, CA (US); Girish Jorapurkar, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 881 days.

(21) Appl. No.: 10/738,431

(22) Filed: Dec. 17, 2003

(51) Int. Cl.
*H04L 12/28* (2006.01)
(52) U.S. Cl. ........................ 370/254; 370/217; 370/222
(58) Field of Classification Search ........................ None
See application file for complete search history.

(56) References Cited

U.S. PATENT DOCUMENTS

| | | | |
|---|---|---|---|
| 4,354,229 A | 10/1982 | Davis et al. | |
| 5,606,669 A | 2/1997 | Bertin et al. | |
| 5,689,706 A | 11/1997 | Rao et al. | |
| 5,761,421 A | 6/1998 | van Hoff et al. | |
| 5,764,982 A | 6/1998 | Madduri | |
| 5,790,553 A | 8/1998 | Deaton, Jr. et al. | |
| 5,802,278 A | 9/1998 | Isfeld et al. | |
| 5,832,195 A | 11/1998 | Braun et al. | |
| 5,918,017 A | 6/1999 | Attanasio et al. | |
| 5,920,566 A | 7/1999 | Hendel et al. | |
| 5,928,326 A | 7/1999 | Boudou et al. | |
| 6,012,096 A | 1/2000 | Link et al. | |
| 6,016,478 A | 1/2000 | Zhang et al. | |
| 6,049,823 A | 4/2000 | Hwang | |
| 6,088,336 A | 7/2000 | Tosey | |
| 6,091,724 A * | 7/2000 | Chandra et al. | 370/390 |
| 6,144,992 A | 11/2000 | Turpin et al. | |
| 6,148,383 A | 11/2000 | Micka et al. | |
| 6,167,432 A | 12/2000 | Jiang | |
| 6,173,293 B1 | 1/2001 | Thekkath et al. | |
| 6,173,374 B1 | 1/2001 | Heil et al. | |
| 6,185,618 B1 | 2/2001 | Brabson | |
| 6,189,079 B1 | 2/2001 | Micka et al. | |
| 6,219,710 B1 | 4/2001 | Gray et al. | |
| 6,272,386 B1 | 8/2001 | McLaughlin et al. | |
| 6,275,888 B1 | 8/2001 | Porterfield | |
| 6,282,170 B1 * | 8/2001 | Bentall et al. | 370/225 |
| 6,304,980 B1 | 10/2001 | Beardsley et al. | |
| 6,314,491 B1 | 11/2001 | Freerksen et al. | |
| 6,317,438 B1 | 11/2001 | Trebes, Jr. | |

(Continued)

OTHER PUBLICATIONS

Traversat, et al, "Project JXTA Virtual Network", Feb. 5, 2002, http://www.jxta.org/docs/JXTAprotocols.pdf.

(Continued)

*Primary Examiner*—Hong Cho
*Assistant Examiner*—Anthony Sol
(74) *Attorney, Agent, or Firm*—Moser IP Law Group

(57) ABSTRACT

A network having a plurality of nodes interconnected by links (virtual communication channels) is disclosed. In one embodiment, the nodes may communicate with each other in a decentralized or peer-to-peer manner. A method for establishing the links among the nodes is disclosed. The links may be established such that the system is able to operate efficiently. In particular, the manner in which the nodes are interconnected by links may enable the system to efficiently route messages and efficiently recover from network failures.

27 Claims, 11 Drawing Sheets

U.S. PATENT DOCUMENTS

| | | |
|---|---|---|
| 6,415,280 B1 | 7/2002 | Farber et al. |
| 6,434,638 B1 | 8/2002 | Deshpande |
| 6,553,031 B1 | 4/2003 | Nakamura et al. |
| 6,584,075 B1 | 6/2003 | Gupta et al. |
| 6,611,872 B1 | 8/2003 | McCanne |
| 6,625,604 B2 | 9/2003 | Muntz et al. |
| 6,631,449 B1 | 10/2003 | Borrill |
| 6,636,886 B1 | 10/2003 | Katiyar et al. |
| 6,643,650 B1 | 11/2003 | Slaughter et al. |
| 6,667,957 B1 | 12/2003 | Corson et al. |
| 6,748,381 B1 | 6/2004 | Chao et al. |
| 6,782,389 B1 | 8/2004 | Chrin et al. |
| 6,839,769 B2 | 1/2005 | Needham et al. |
| 6,850,987 B1 | 2/2005 | McCanne et al. |
| 6,871,235 B1 | 3/2005 | Cain |
| 7,216,179 B2 * | 5/2007 | Ott et al. .................... 709/238 |
| 2002/0065919 A1 | 5/2002 | Taylor et al. |
| 2002/0103998 A1 | 8/2002 | DeBruine |
| 2002/0114341 A1 | 8/2002 | Sutherland et al. |
| 2002/0143855 A1 | 10/2002 | Traversat et al. |
| 2002/0147771 A1 | 10/2002 | Traversat et al. |
| 2002/0147815 A1 | 10/2002 | Tormasov et al. |
| 2002/0184311 A1 | 12/2002 | Traversat et al. |
| 2003/0041141 A1 | 2/2003 | Abdelaziz et al. |
| 2004/0044727 A1 | 3/2004 | Abdelaziz et al. |
| 2004/0054807 A1 * | 3/2004 | Harvey et al. ............... 709/243 |
| 2004/0064512 A1 | 4/2004 | Arora et al. |
| 2004/0064568 A1 | 4/2004 | Arora et al. |
| 2004/0088347 A1 | 5/2004 | Yeager et al. |
| 2004/0088348 A1 | 5/2004 | Yeager et al. |
| 2004/0088646 A1 | 5/2004 | Yeager et al. |
| 2004/0098447 A1 | 5/2004 | Verbeke et al. |
| 2004/0148326 A1 | 7/2004 | Nadgir et al. |
| 2004/0162871 A1 | 8/2004 | Pabla et al. |
| 2005/0086469 A1 * | 4/2005 | Dunagan et al. ............ 713/163 |

OTHER PUBLICATIONS

A. Rowstron and P. Druschel. "Pastry: Scalable, distributed object location and routing for large-scale peer-to-peer systems." In Proc. *IFIP/ACM Middleware 2001*, Heidelberg, Germany, Nov. 2001.

Zhao, et al "Tapestry: An Infrastructure for Fault-tolerant Wide-area Location and Routing" *UCB Tech. Report UCB/CSD-01-1141*. Apr. 2001.

Stoica, et al "Chord: A Scalable Peer-to-peer Lookup Service for Internet Applications," *ACM SIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the 5th OSDI*, Dec. 2002.

Garces-Erice, et al; "Hierarchical Peer-to-Peer Systems," In the Special issue of the *Parallel Processing Letters* (PPL), Dec. 2003, vol. 13, No. 4.

"Lustre Whitepaper Version 1.0" Cluster File Systems, Inc., Nov. 11, 2002.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21, Feb. 26, 2002.

* cited by examiner

Determine an ordering for the plurality of N nodes such that the nodes are circularly ordered as nodes $D_0, D_1, D_2, \ldots D_{N-1}$

401

Each node $D_i$ in the plurality of nodes establishes a link to X other nodes chosen as nodes $D_{i+1}, D_{i+2}, \ldots D_{i+X}$, wrapping to $D_0$ if necessary

403

For at least a subset of the nodes, each node $D_j$ in the subset establishes a link with one or more randomly chosen nodes not in the set $D_{j-X}, D_{j-X+1}, \ldots D_{j-1}, D_{j+1}, D_{j+2}, \ldots D_{j+X}$ and each node in the set $D_{j-X}, D_{j-X+1}, \ldots D_{j-1}, D_{j+1}, D_{j+2}, \ldots D_{j+X}$ establishes a link with the one or more nodes randomly chosen by the node $D_j$

OVERLAY NETWORK WITH EFFICIENT ROUTING AND RECOVERY

BACKGROUND OF THE INVENTION

1. Field of the Invention

This invention relates to computer networks and, more particularly, to an overlay network comprising a plurality of nodes that are interconnected in a manner that enables message routing and failure recovery to be performed efficiently.

2. Description of the Related Art

Computer networks are important for many different applications. One important type of networking is referred to as peer-to-peer or P2P networking. As used herein, a peer-to-peer network is generally used to describe a decentralized network of peer nodes where each node may have similar capabilities and/or responsibilities. Participating peer nodes in a P2P network may communicate directly with each other. Work may be done and information may be shared through interaction among the peers. In addition, in a P2P network, a given peer node may be equally capable of serving as either a client or a server for another peer node.

A peer-to-peer network may be created to fulfill some specific need, or it may be created as a general-purpose network. Some P2P networks are created to deliver one type of service and thus typically run one application. For example, Napster was created to enable users to share music files. Other P2P networks are intended as general purpose networks which may support a large variety of applications. Any of various kinds of distributed applications may execute on a P2P network. Exemplary peer-to-peer applications include file sharing, messaging applications, distributed data storage, distributed processing, etc.

In a typical P2P network, peer nodes communicate with each other via links or virtual communication channels built on top of lower level network connections, such as local area network (LAN) or wide area network (WAN) connections. The set of nodes interconnected by these links is also referred to herein as an overlay network. Any given node in the P2P network may have links to only a small number of nodes relative to the total number of nodes in the system. For example, in a system with 1000 nodes, perhaps each node may have links to only 10 other nodes.

Nodes may send messages to other nodes via the links. For example, various nodes may store routing information that indicates which links to traverse to send messages to particular destinations. The manner in which the nodes are interconnected with links may affect efficiency of the system. Thus, it is desirable to establish the links in such a way that the system is able to operate efficiently. In particular, in many applications it is desirable to establish the links in such a way that the system is able to efficiently route messages and efficiently recover from network failures.

SUMMARY

A plurality of links may be established among a plurality of N nodes. Each link between two nodes may comprise a virtual communication channel between the two nodes. According to one embodiment of a method for establishing the links, an ordering for the plurality of N nodes may be determined such that the nodes are circularly ordered as nodes $D_0$, $D_1$, $D_2$, $D_{N-1}$. In one embodiment, the ordering may be based on node IDs of the nodes.

Each node $D_i$ in the plurality of nodes may establish a link to X other nodes chosen as nodes $D_{i+1}$, $D_{i+2}$, ... $D_{i+X}$, wrapping to $D_0$ if necessary. For at least a subset of the plurality of nodes, each node $D_j$ in the subset may establish a link with one or more additional chosen nodes not in the set $D_{j-X}$, $D_{j-X+1}$, ... $D_{j-1}$, $D_{j+1}$, $D_{j+2}$, ... $D_{j+X}$. In one embodiment, for each node $D_j$ in the subset, each node in the set $D_{j-X}$, $D_{j-X+1}$, ... $D_{j-1}$, $D_{j+1}$, $D_{j+2}$, ... $D_{j+X}$ may also establish a link with the one or more additional nodes chosen by the node $D_j$.

In one embodiment, each node $D_j$ in the subset may choose the additional node(s) not in the set $D_{j-X}$, $D_{j-X+1}$, ... $D_{j-1}$, $D_{j+1}$, $D_{j+2}$, ... $D_{j+X}$ by randomly choosing the additional node(s) and may establish a link to the randomly chosen node(s).

In various embodiments, the links formed as described above may be utilized to perform network communication of any kind. In one embodiment, the nodes may utilize the links to communicate with one another in a decentralized or peer-to-peer manner. In one embodiment, routes for sending messages among the nodes may be constructed as a mapping to the links, and messages may be sent over these routes.

BRIEF DESCRIPTION OF THE DRAWINGS

A better understanding of the invention can be obtained when the following detailed description is considered in conjunction with the following drawings, in which:

FIG. 5 is a flowchart diagram illustrating one embodiment of a method for establishing links among a plurality of nodes in the system;

Figure 1:
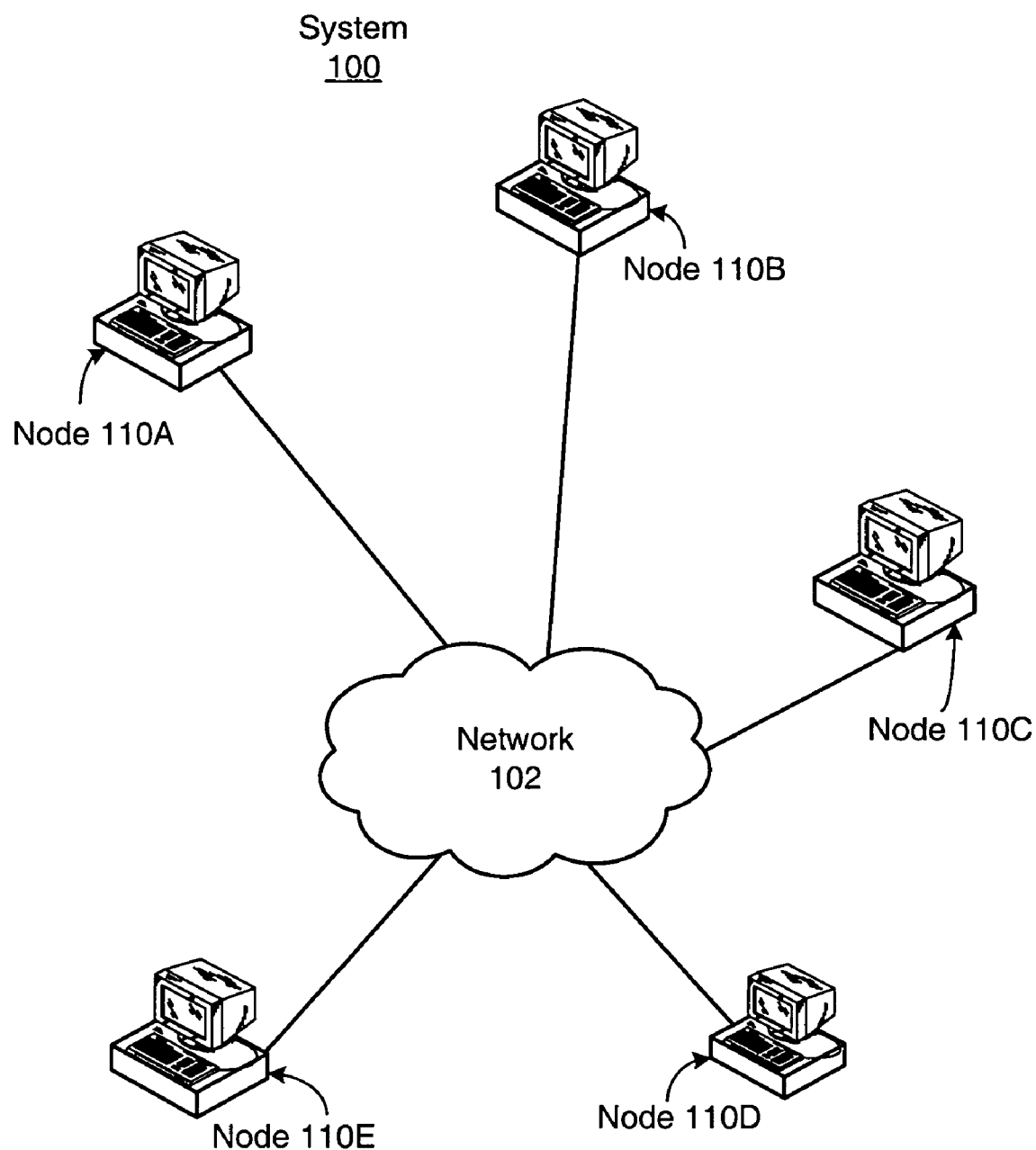
FIG. 1 illustrates one embodiment of a system that includes a plurality of nodes.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a system 100 that includes a plurality of nodes (e.g., computer systems) 110. In this example, the system 100 includes nodes 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In one embodiment, the nodes 110 may form a peer-to-peer network. For example, the system 100 may comprise a decentralized network of nodes 110 where each node 110 may have similar capabilities and/or responsibilities. As described below, each node 110 may communicate directly with at least a subset of the other nodes 110. In one embodiment, messages may be propagated through the system 100 in a decentralized manner. For example, in one embodiment each node 110 in the system 100 may effectively act as a message router.

In another embodiment, the nodes 110 in the system 100 may be organized or may communicate using a centralized networking methodology, or the system 100 may utilize a combination of centralized and decentralized networking methodologies. For example, some functions of the system 100 may be performed by using various nodes 110 as centralized servers, whereas other functions of the system 100 may be performed in a peer-to-peer manner.

In one embodiment, each node 110 may have an identifier (ID). The ID of a node 110 may comprise any kind of information usable to identify the node 110, such as numeric or textual information. In one embodiment, a node ID may comprise a 128-bit (or other length) Universally Unique IUD (UUID). Universally Unique IDs or UUIDs may be allocated based on known art that ensures that the UUIDs are unique.

Figure 2:
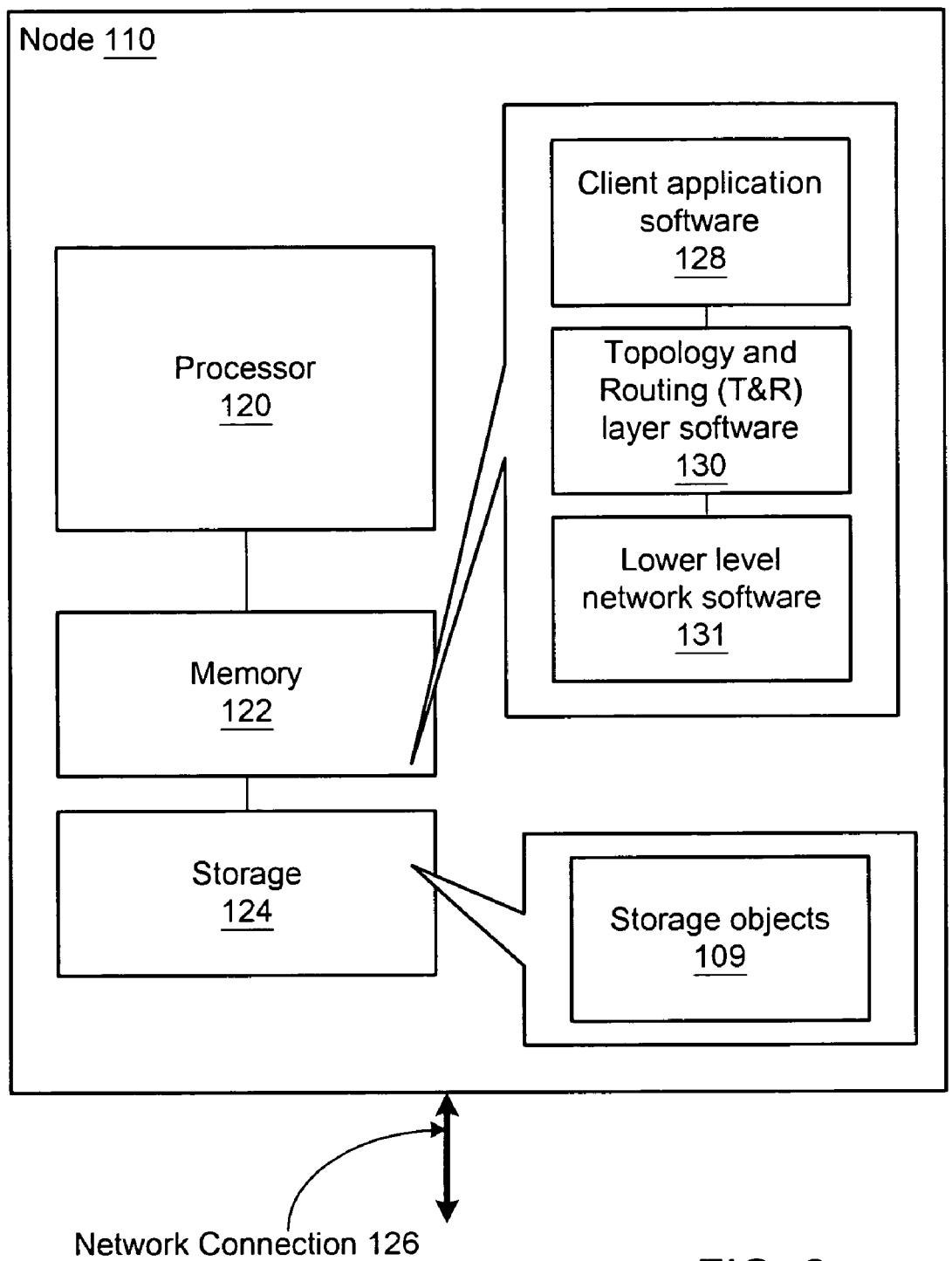
FIG. 2 illustrates one embodiment of a node in the system.

Referring now to FIG. 2, a diagram of one embodiment of a node 110 in the system 100 is illustrated. Generally speaking, a node 110 may include any of various hardware and software components. In the illustrated embodiment, the node 110 includes a processor 120 coupled to a memory 122, which is in turn coupled to a storage device 124. The node 110 may also include a network connection 126 through which the node 110 couples to the network 102. The network connection 126 may include any type of hardware for coupling the node 110 to the network 102, e.g., depending on the type of node 110 and type of network 102.

The processor 120 may be configured to execute instructions and to operate on data stored within the memory 122. In one embodiment, the processor 120 may operate in conjunction with the memory 122 in a paged mode, such that frequently used pages of memory may be paged in and out of the memory 122 from the storage 124 according to conventional techniques. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the node 110 may include multiple processors 120.

The memory 122 may be configured to store instructions and/or data. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The storage 124 may be configured to store instructions and/or data, e.g., may be configured to store instructions and/or data in a persistent or non-volatile manner. In one embodiment, the storage 124 may include non-volatile memory, such as magnetic media, e.g., one or more hard drives, or optical storage. In one embodiment, the storage 124 may include a mass storage device or system. For example, in one embodiment, the storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage 124 may include tape drives, optical storage devices or RAM disks, for example.

As shown in FIG. 2, in one embodiment the storage 124 may store one or more storage objects 109. As used herein, the term "storage object" may comprise any kind of data structure or entity used to store or represent data or information. In one embodiment, each storage object 109 may comprise a file. The storage objects 109 may include data or information of any kind, where the data is organized or structured in any way. In various embodiments, the storage objects 109 may be utilized within the system 100 in any application or to perform any function. Any number of storage objects 109 may be stored in the storage 124 of a given node 110.

In another embodiment, one or more of the storage objects 109 associated with the node 110 may be stored in the memory 122 instead of or in addition to the storage 124. For example, various storage objects 109 or portions of storage objects 109 may be transferred in and out of memory 122 from storage 124 as necessary, e.g., as required by other software executing on the node 110.

In one embodiment, each storage object 109 may have an identifier (ID). The ID of a storage object 109 may comprise any kind of information usable to identify the storage object 109, such as numeric or textual information. In one embodiment, a storage object ID may comprise a 128-bit Universally Unique ID (UUID). In one embodiment, various storage objects 109 may be replicated on different nodes 110. Multiple replicas of a storage object 109 may be linked together, e.g., so that data can be kept consistent across the replicas.

In one embodiment, the memory 122 may store lower level network software 131. The lower level network software 131 (also referred to as link layer software) may be executable by the processor 120 to interact with or control the network connection 126, e.g., to send and receive data via the network connection 126. The lower level network software 131 may also be responsible for discovering other nodes 110 or establishing communication links from the node 110 to other nodes 110. The memory 122 may also store topology and routing (T&R) layer software 130 which utilizes the lower level network software 131. Memory 122 may also store client application software 128 that utilizes the T&R layer software 130.

In one embodiment, the T&R layer software 130 may be executable by the processor 120 to create and manage data structures allowing client application software 128 to communicate with other nodes 110 in the system 100, e.g., to communicate with other client application software 128 executing on other nodes 110. In one embodiment, the client application software 128 may utilize the T&R layer software 130 to send messages to other nodes 110 via links established by the link layer software. Similarly, the T&R layer software 130 may pass messages received from other nodes 110 to the client application software 128, e.g., messages which originate from client application software 128 executing on other nodes 110. The T&R layer software 130 may also be involved in forwarding messages routed through the local node 110, where the messages originate from another node 110 and are addressed to another node 110 in the system 100.

In one embodiment the functionality of the T&R layer software 130 may be modularized into builder functionality and router functionality. For example, a builder component or engine 132 may be responsible for creating and managing data structures or routing information 136 representing topology of the system 100. A router component or message routing engine 134 may utilize the data structures or routing information 136 to send or forward messages to other nodes 110 in the system 100. The builder 132 and router 134 may interface with each other as necessary. For example, in the event of a network failure that invalidates existing routing information, the router 134 may request the builder 132 to recover or rebuild routing information 136 so that the router 134 can send or forward a message using a different route.

Figure 3:
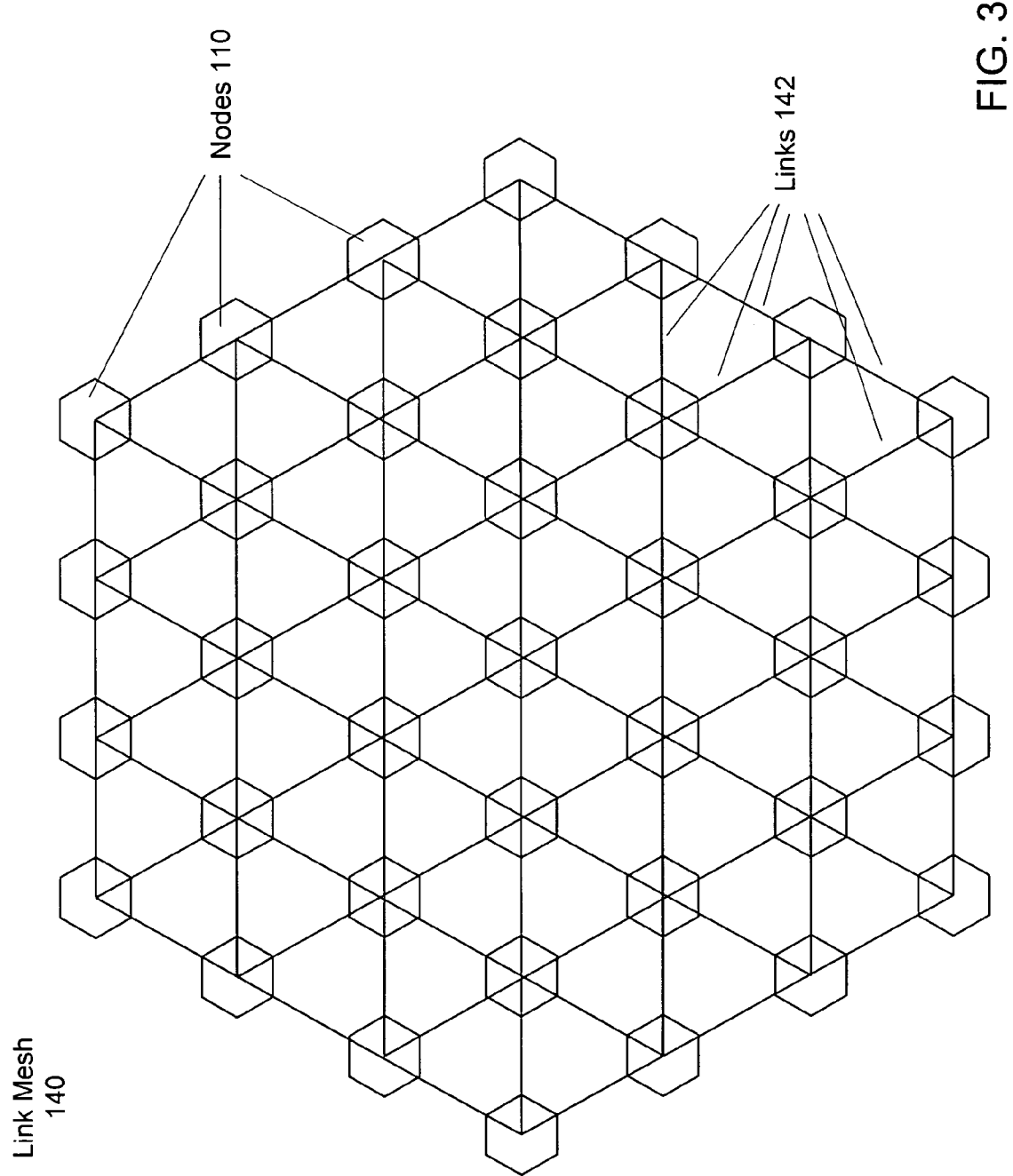
FIG. 3 illustrates a link mesh utilized by the system according to one embodiment.

FIG. 3 illustrates a link mesh 140 utilized by the system 100 according to one embodiment. In this embodiment, as each node 110 joins the system 100, the node 110 may establish links 142 with at least a subset of other nodes 110 in the system 100. As used herein, a link 142 may comprise a virtual communication channel or connection between two nodes 110. Thus, the links 142 are also referred to herein as virtual links 142. Each link 142 may be bi-directional so that each of the two nodes connected by the link 142 can use the link 142 to communicate with the other node.

In one embodiment, the lower level network software 131 executing on a given node 110 may be responsible for performing a node discovery process and creating links 142 with other nodes 110 as the node 110 comes online in the system 100. For example, in one embodiment, the lower level network software 131 may include a link layer that invokes a node discovery layer and then builds virtual node-to-node communication channels or links 142 to one or more of the discovered nodes 110. The nodes 110 with which a given node 110 establishes links are also referred to herein as neighbor nodes, or simply neighbors.

The resulting set of connected nodes 110 is referred to herein as a link mesh 140. In FIG. 3, each hexagon represents a node 110, and each line represents a link 142 between two nodes 110. It is noted that FIG. 3 is exemplary only, and in various embodiments, any number of nodes 110 may be connected together by the link mesh 140, and each node 110 may establish links 142 to any number of neighbor nodes 110. One embodiment of a method for establishing links 142 among the nodes 110 is described in detail below.

The nodes 110 interconnected by virtual links 142 effectively comprise an overlay network in which nodes communicate by routing messages to each other over the established links 142. In various embodiments, each virtual link 142 may be implemented using any of various networking methodologies or protocols. For example, in one embodiment, each virtual link 142 may be implemented using a network protocol such as TCP or UDP. Although a virtual link 142 may directly connect two nodes 110 with respect to the overlay network, the virtual link 142 or direct connection may be implemented as a network connection that passes through one or more intermediate devices or computer systems. For example, a virtual link 142 may be implemented as a network connection that passes through one or more devices such as routers, hubs, etc. However, when a first node 110 establishes a virtual link 142 to a second node 110, the first node 110 may pass messages to the second node 110 (and vice versa) via the virtual link 142 without the message being seen as a message on the overlay network by any intermediate nodes 110.

In one embodiment, nodes 110 in the system 100 may be organized or divided into multiple realms. As used herein, a realm refers to a group of nodes 110 that communicate with each other in a low-latency, reliable manner and/or physically reside in the same geographic region. In one embodiment, each realm may comprise a local area network (LAN). As used herein, a LAN may include a network that connects nodes within a geographically limited area. For example, one embodiment of a LAN may connect nodes within a 1 km radius. LANs are often used to connect nodes within a building or within adjacent buildings. Because of the limited geographic area of a LAN, network signal protocols that permit fast data transfer rates may be utilized. Thus, communication among nodes 110 within a LAN (or within a realm) may be relatively efficient. An exemplary LAN may include an Ethernet network, Fiber Distributed Data Interface (FDDI) network, token ring network, etc. A LAN may also connect one or more nodes via wireless connections, such as wireless Ethernet or other types of wireless connections.

In one embodiment, each realm or LAN may have an identifier (ID). The ID of a realm may comprise any kind of information usable to identify the realm, such as numeric or textual information. In one embodiment, a realm ID may comprise a 128-bit Universally Unique ID (UUID).

For any given node 110 in a given realm, links 142 may be established from the node 110 to other nodes 110 in the same realm and/or to nodes 110 in other realms (remote realms). The term "near neighbors" may be used to refer to nodes 110 to which the given node 110 is connected in the same realm. The term "remote neighbors" may be used to refer to nodes 110 to which the given node 110 is connected in a different realm. As various messages are sent from a given node 110 in a given realm to other nodes 110, the messages may be sent to near neighbors and/or remote neighbors. In one embodiment, send operations may be restricted to the local realm where possible. This may be useful, for example, to avoid the overhead of a wide area network (WAN) transfer. In one embodiment, an application programming interface (API) for sending a message may allow the client application software 128 executing on a node 110 to specify whether or how to restrict the send operation in this manner.

Figure 4:
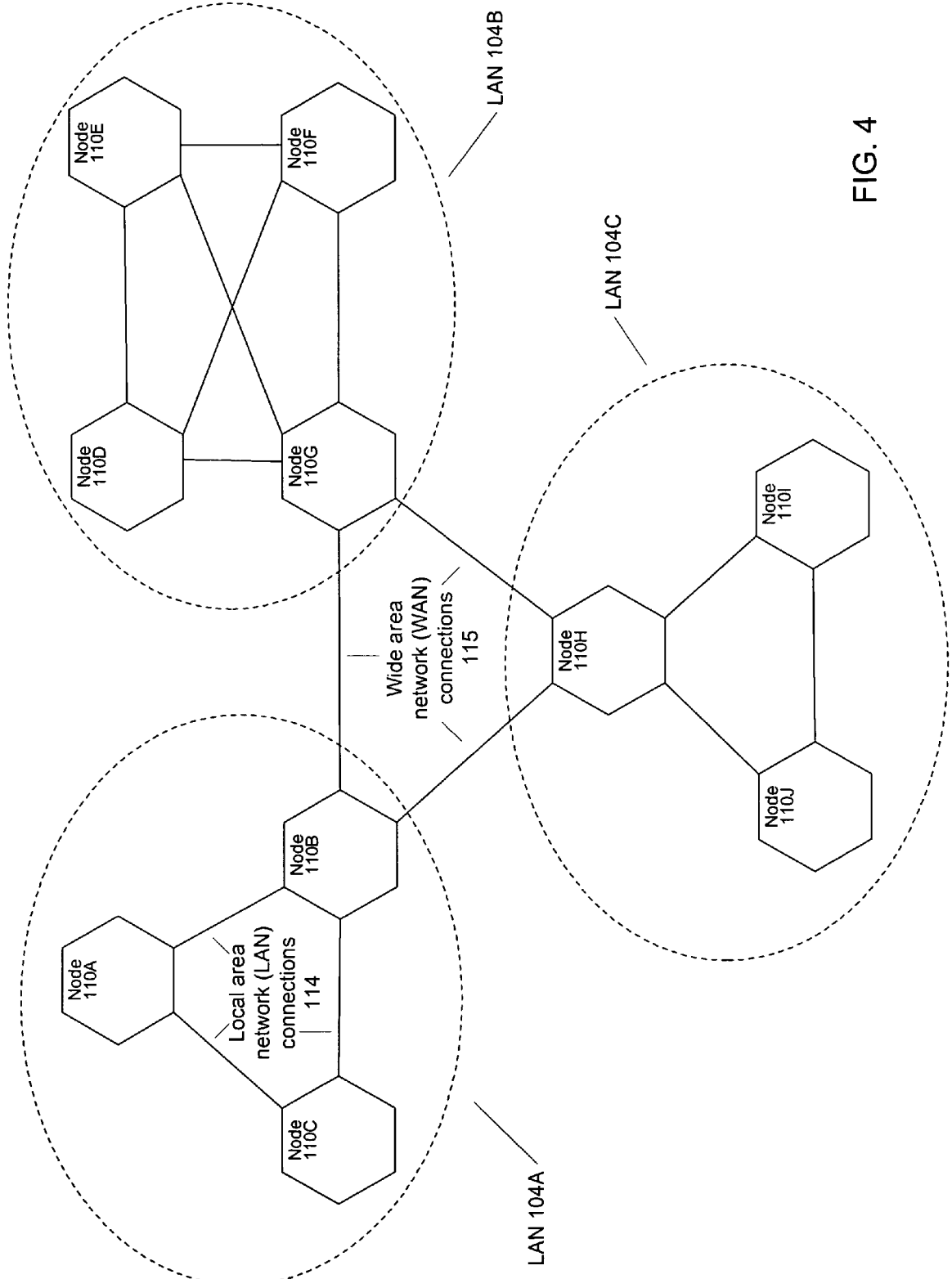
FIG. 4 illustrates one embodiment of the system organized into three local area networks (LANs)

FIG. 4 illustrates one embodiment of a system 100 organized into three LANs 104. LAN 104A includes nodes 110A-110C; LAN 104B includes nodes 110D-110G; and LAN 104C includes nodes 110H-110J. Each line connecting two nodes 110 within a LAN 104 may represent a LAN connection 114, e.g., an Ethernet connection, FDDI connection, token ring connection, or other connection, depending on the type of LAN utilized.

As used herein, a "wide area network (WAN) connection" may comprise a network connection between two nodes in different realms or LANs 104. As shown in FIG. 4, WAN connections 115 may be utilized to interconnect the various realms, e.g., LANs 104, within the system 100. A WAN connection may allow two nodes 110 that are separated by a relatively long distance to communicate with each other. For example, in one embodiment a WAN connection 115 may connect two nodes 110 that are separated by 1 km or more. (WAN connections 115 may also be used to interconnect two nodes 110 in different realms or LANs, where the two nodes 110 are separated by a distance of less than 1 km.) In one embodiment, the data transfer rate via a WAN connection 115 may be relatively slower than the data transfer rate via a LAN connection 114. In various embodiments, a WAN connection 115 may be implemented in various ways. A typical WAN connection may be implemented using bridges, routers, telephony equipment, or other devices.

It is noted that FIG. 4 illustrates a simple exemplary system 100. In various embodiments, the system 100 may include any number of realms or LANs 104, and each realm or LAN 104 may include any number of nodes 110. Also, although FIG. 4 illustrates an example in which a single node from each realm is connected to a single node of each of the other realms, in various embodiments, various numbers of WAN connections 115 may be utilized to interconnect two realms or LANs. For example, a first node in a first realm may be connected to both a second node and a third node in a second realm. As another example, a first node in a first realm may be connected to a second node in a second realm, as well as a third node in the first realm being connected to a fourth node in the second realm.

As described above, each node 110 in the system 100 may be connected by links 142 to one or more other nodes 110. In various embodiments, any desired method may be utilized to determine how to link together the various nodes 110. The manner in which the nodes 110 are interconnected with links 142 may affect various properties of the system 100, such as its efficiency in routing messages and recovering from network failures.

FIG. 5 is a flowchart diagram illustrating one embodiment of a method for establishing links 142 among nodes 110 within a given realm or LAN having a plurality of N nodes 110. Thus, the method of FIG. 5 may be employed in each realm in the system 100 to interconnect nodes 110 within that realm. (In addition, one or more links 142 may also be established from one or more nodes 110 within the local realm to one or more nodes within one or more remote realms, as described above with reference to FIG. 4.) It is noted that FIG. 5 illustrates a representative embodiment, and alternative embodiments are contemplated.

In 401, an ordering for the plurality of N nodes may be determined such that the nodes are circularly ordered as nodes $D_0, D_1, D_2, \ldots D_{N-1}$. Thus, node $D_0$ may be first in the ordering, followed by $D_1$, $D_2$, etc., up to $D_{N-1}$. Since the ordering is circular, node $D_0$ follows node $D_{N-1}$. In other words, the ordering wraps from $D_{N-1}$ back to $D_0$.

In various embodiments, any desired technique may be utilized to determine the ordering for the N nodes. In one embodiment, the ordering may be based on information regarding the nodes. As noted above, each node may have a node ID. In one embodiment, the ordering may be based on the node IDs. For example, the node IDs may simply be ordered from lowest to highest in numerical (or other) order and node Do may be designated as the node with the lowest node ID and node $D_{N-1}$ may be designated as the node with the highest node ID.

Figure 6:
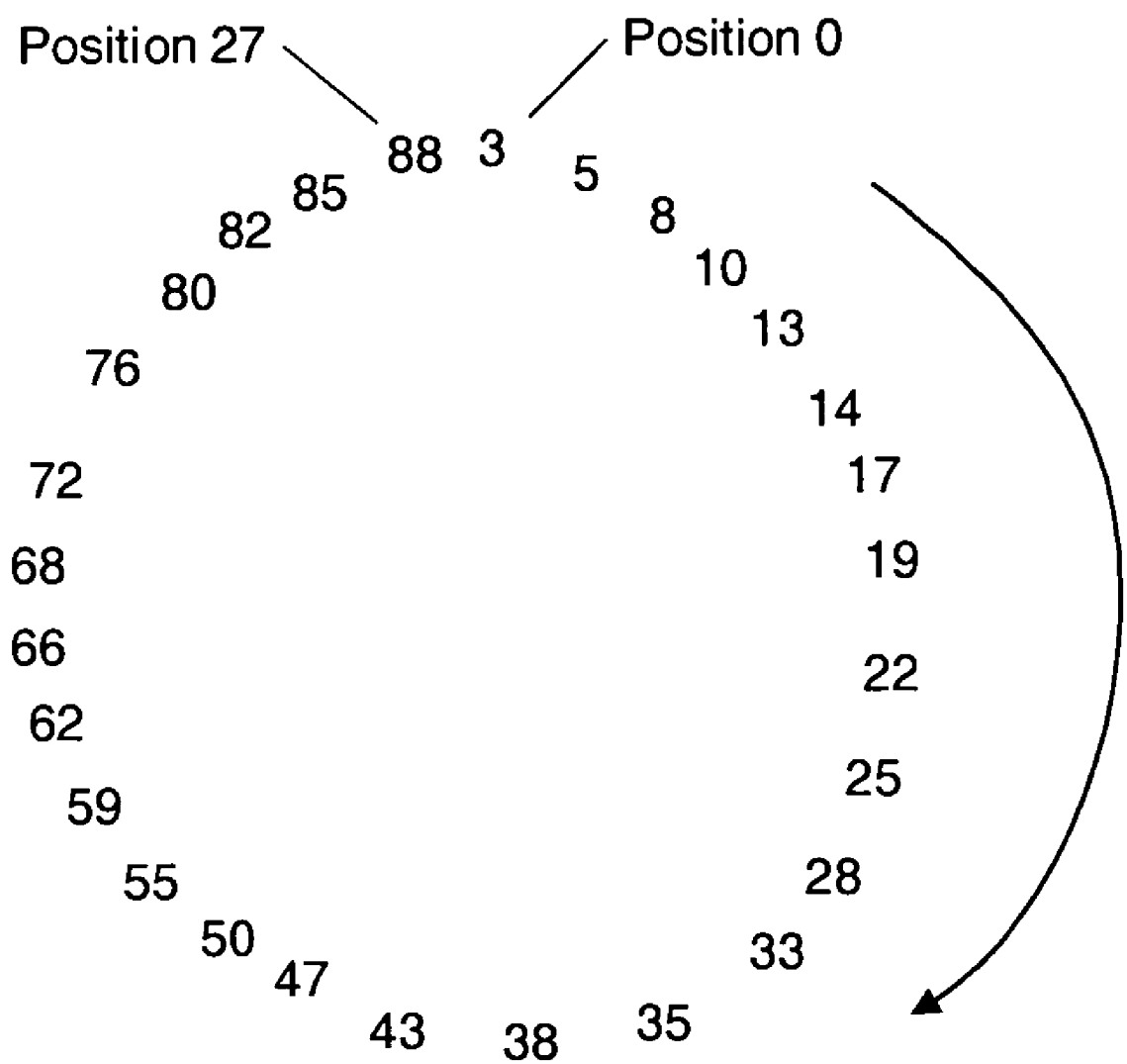
FIG. 6 illustrates a simple example of 28 node IDs circularly ordered from lowest to highest.

FIG. 6 illustrates a simple example of 28 node IDs circularly ordered from lowest to highest. In this example, the node with the node ID "3" (referred to as node "3" for convenience) may be designated as node $D_0$, the node with the node ID "5" (referred to as node "5" for convenience) may be designated as node $D_1$, etc., up to the node with the node ID "88" (referred to as node "88" for convenience) designated as node $D_{N-1}$. FIG. 6 is exemplary only. In various embodiments, any number of nodes may be present in the realm. Also, the node IDs may be more complex than the simple numbers shown here. For example, as noted above, in one embodiment each node ID may comprise a 128-bit Universally Unique ID (UUID).

It is noted that in other embodiments the nodes may be ordered in other ways, e.g., based on other information regarding the nodes besides node IDs. For example, in one embodiment the nodes may be ordered based on their geographical locations with respect to each other. As another example, in another embodiment the nodes may be ordered based on their respective computing resources or processing capabilities.

In 403, each node $D_i$ in the plurality of nodes may establish a link to X (where X is a numeric constant) other nodes chosen as nodes $D_{i+1}, D_{i+2}, \ldots D_{i+X}$, wrapping to $D_0$ if necessary. Thus, each node may be operable to establish X links to other nodes in 403. For example, node $D_0$ may establish links to nodes $D_1, D_2, \ldots D_X$. Similarly, node $D_1$ may establish links to nodes $D_2, D_3, \ldots D_{X+1}$, and node $D_2$ may establish links to nodes $D_3, D_4, \ldots D_{X+2}$. In choosing the nodes to which to establish links, nodes higher in the ordering may wrap back to node $D_0$. For example, node $D_{N-2}$ may establish links to nodes $D_{N-1}, D_0, \ldots D_{X-2}$, and node $D_{N-1}$ may establish links to nodes $D_0, D_1, \ldots D_{X-1}$.

Thus, for any given node in the plurality of nodes, the node may establish links to X other nodes, and X other nodes may establish links to that node. For example, node $D_0$ may establish links to nodes $D_1, D_2, \ldots D_X$, and nodes $D_{N-1}, D_{N-2}, \ldots D_{N-X}$ may establish links to node $D_0$. Thus, after all links are established in this manner, each node in the plurality of nodes may have links to 2X other nodes. As described above, the links may be bi-directional so that, for example, node $D_0$ can use the link established to node $D_1$ to communicate information to node $D_1$, as well as node $D_1$ using the link to communicate information to node $D_0$.

In various embodiments, the number X may vary. For example, X may be set based on considerations such as the number of nodes (N) within the realm, the type of network that connects nodes within the realm, the computing resources available on the nodes, etc.

Figure 7:
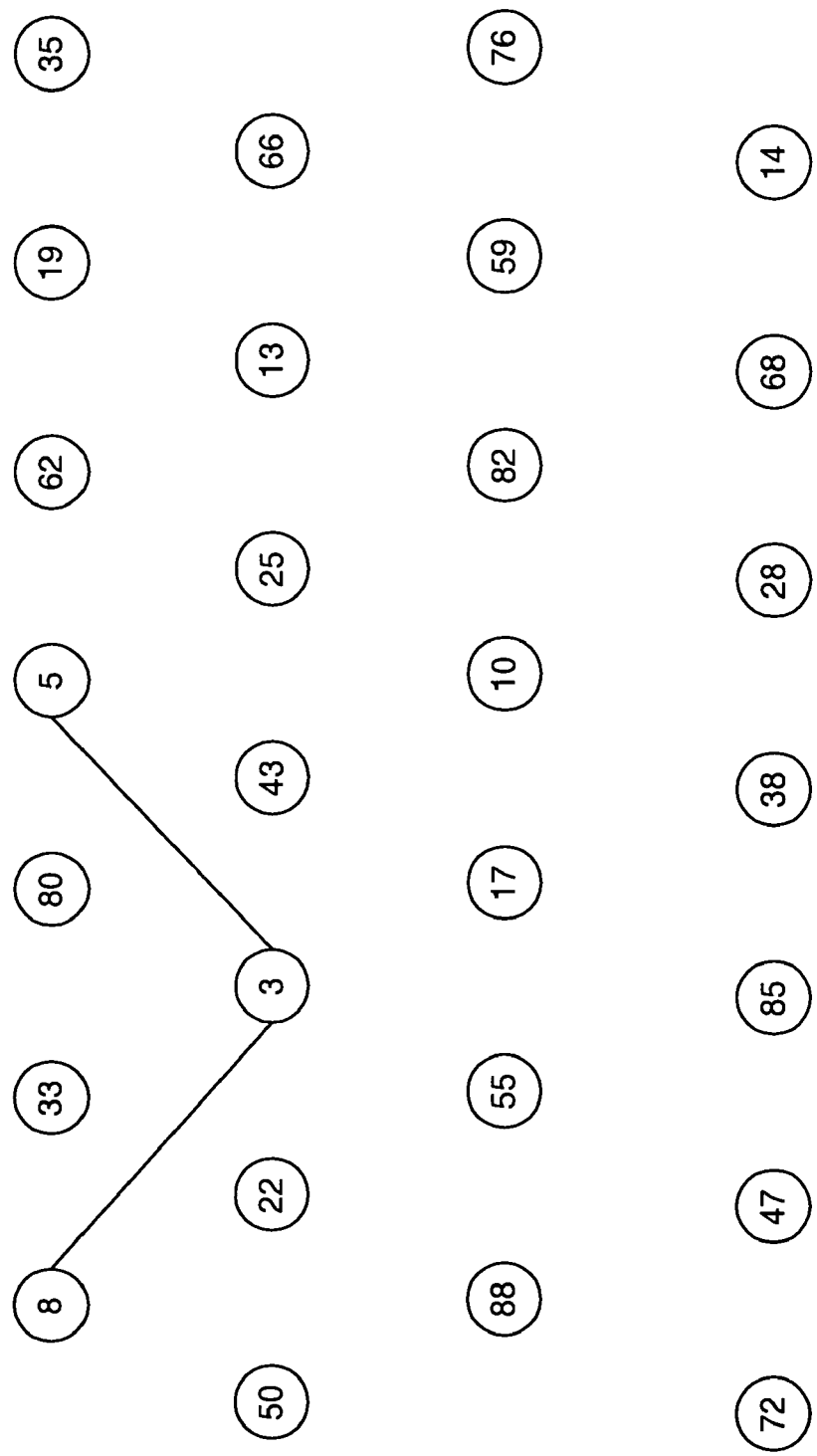
FIGS. 7-11 illustrate a process of establishing links among nodes according to one embodiment in a simple exemplary system.
Figure 8:
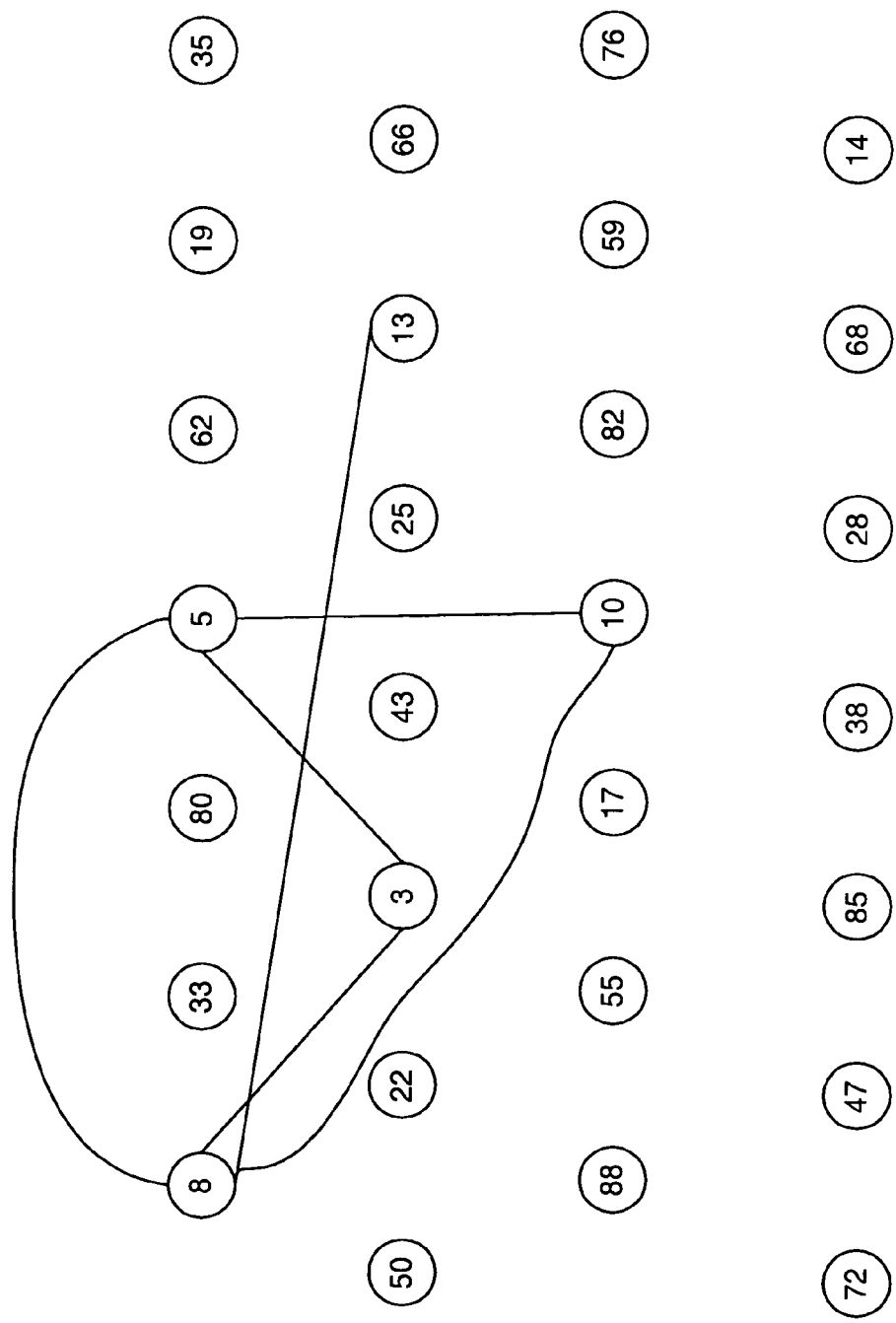
Figure 9:
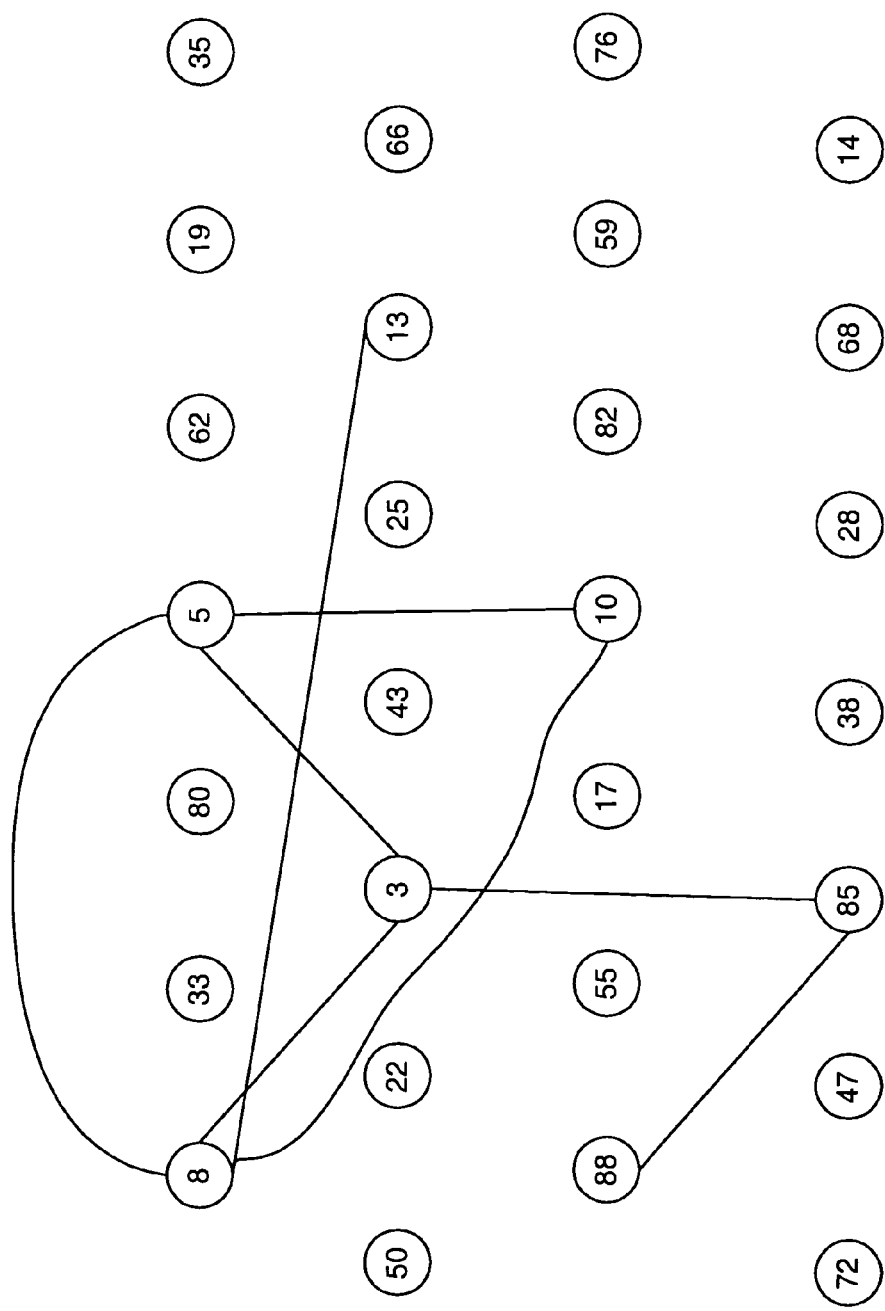
Figure 10:
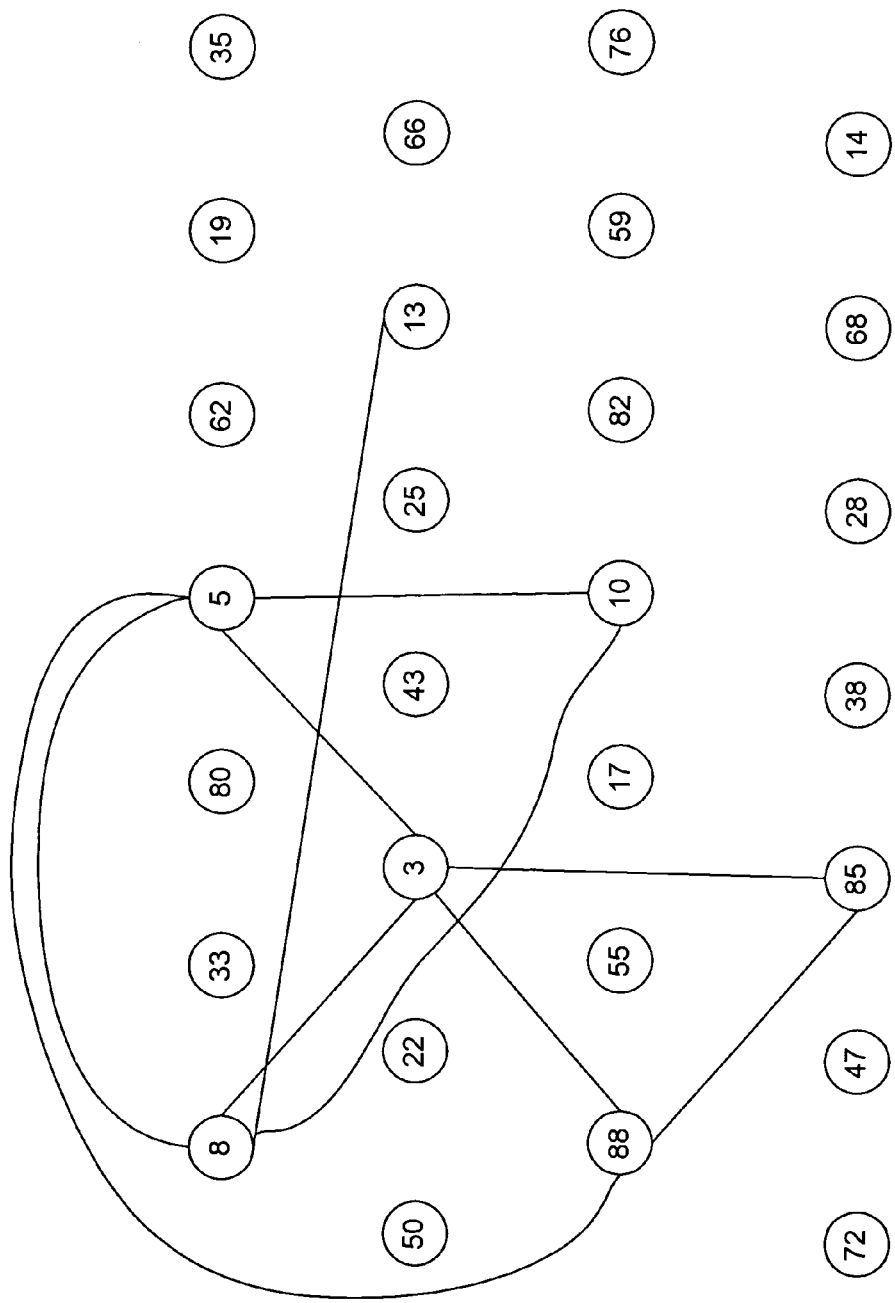

As an example, suppose that X is 2. Thus, node $D_0$ may establish links to two other nodes chosen as $D_1$ and $D_2$. Thus, in the example of FIG. 6, node "3" (designated as node $D_0$) may establish a link to node "5" (designated as node $D_1$) and may establish a link to node "8" (designated as node $D_2$), as shown in FIG. 7. Similarly, node $D_1$ may establish links to two other nodes chosen as $D_2$ and $D_3$. Thus, continuing the example, node "5" (designated as node $D_1$) may establish a link to node "8" (designated as node $D_2$) and may establish a link to node "10" (designated as node $D_3$), as shown in FIG. 8. Similarly, node "8" (designated as node $D_2$) may establish a link to node "10" (designated as node $D_3$) and may establish a link to node "13" (designated as node $D_4$), as shown in FIG. 9. FIG. 9 also illustrates links established by node "85" (designated as node $D_{26}$) to node "88" (designated as node $D_{27}$) and node "3" (designated as node $D_0$), where the selection wrapped back to node "3" (node $D_0$) as described above. (For clarity, links established by nodes between node "8" and node "85" are not shown on the diagram.) FIG. 10 illustrates links established by node "88" (designated as node $D_{27}$) to node "3" (designated as node $D_0$) and node "5" (designated as node $D_1$).

As described above, after the links have been established in accordance with 403 of FIG. 5, each node $D_i$ has links to 2X nodes, i.e., the nodes in the set $D_{i-X}, D_{i-X+1}, \ldots D_{i-1}, D_{i+1}, D_{i+2}, \ldots D_{i+X}$. In one embodiment, in addition to these links, one or more nodes in the plurality of N nodes may establish additional links. In various embodiments, the nodes which establish additional links may be chosen in any of various ways, and the nodes to which these nodes establish links may also be chosen in any of various ways. FIG. 5 illustrates a representative embodiment in which additional links are established in 405.

In 405, for at least a subset of the plurality of nodes, each node $D_j$ in the subset may establish a link with one or more randomly chosen nodes not in the set $D_{j-X}, D_{j-X+1}, \ldots D_{j-1}$, $D_{j+1}, D_{j+2}, \ldots D_{j+X}$. (In other words, $D_j$ may establish a link with one or more randomly chosen nodes not in the set of nodes that $D_j$ is already linked to.) In one embodiment, each node $D_j$ in the subset may only choose one other node to which to establish a link. In addition, in one embodiment, each node in the set $D_{j-X}, D_{j-X+1}, \ldots D_{j-1}, D_{j+1}, D_{j+2}, \ldots D_{j+X}$ may also establish a link with the one or more nodes randomly chosen by the node $D_j$. (In other words, each node to which $D_j$ was already linked may also establish a link with the one or more nodes randomly chosen by $D_j$.) For example, node $D_j$ may inform each of these nodes of the one or more randomly chosen nodes and may request each of them to establish a link to the randomly chosen node(s).

Figure 11:
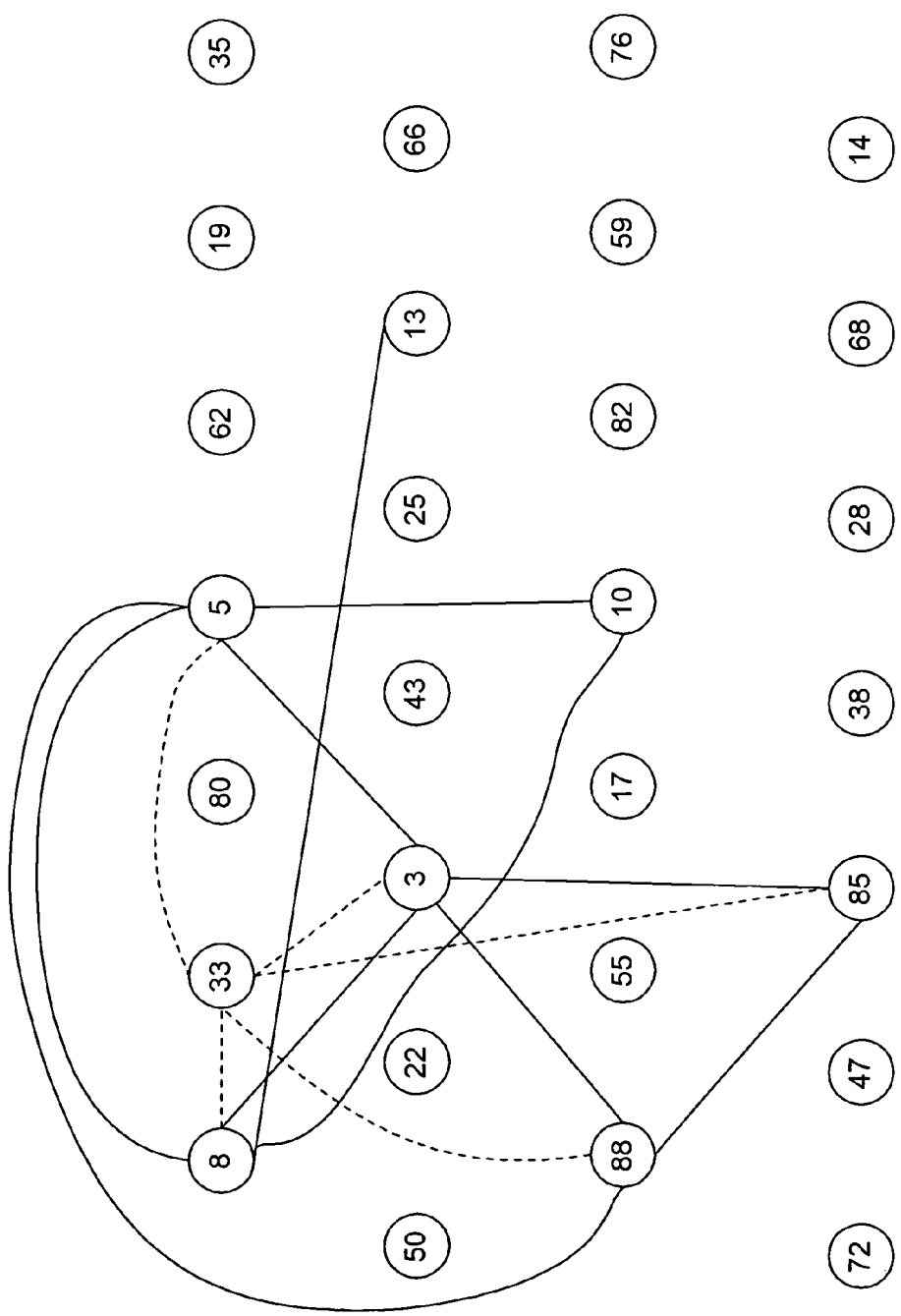

For example, FIG. 11 continues the example of FIG. 10. Solid lines illustrate links already established as described above and shown in FIG. 10. Dashed lines illustrate additional links established in accordance with 405. In this example, node $D_0$, i.e., node "3" randomly chose node "33" as an additional node to which to establish a link. In addition, each node in the set of nodes to which node "3" was already linked (i.e., nodes "85", "88", "5", and "8") also established a link to node "33".

In various embodiments, the subset of nodes that randomly choose other nodes to which to establish links may be determined in various ways. In one embodiment, this subset of nodes may include each node whose position in the ordering determined in 401 is a multiple of 2X. For example, if X is 2, then in the exemplary plurality of 28 nodes discussed above with reference to FIGS. 6-10, nodes $D_0$ (node "3"), $D_4$ (node "13"), $D_8$ (node "22"), $D_{12}$ (node "35"), $D_{16}$ (node "50"), $D_{20}$ (node "66"), and $D_{24}$ (node "80") may be included in the subset of nodes that randomly choose other nodes to which to establish links.

As noted above, the manner in which nodes 110 are interconnected with links 142 may affect various properties of the system 100. In some applications, interconnecting a plurality of nodes according to the method described above may confer efficiency benefits. In particular, the method may enable efficient routing of messages within the plurality of nodes (e.g., within nodes in a realm).

The links that interconnect the plurality of nodes may be used to route or send messages among the nodes. In one embodiment, routes or routing data structures for sending messages among the nodes may be constructed (e.g., by T&R layer software 130) as a mapping to the links. For example, where a node A is connected to a node B by a first link, and the node B is connected to a node C by a second link, a route to send a message from node A to node C may map to the first link and the second link. For example, constructing the route from node A to node C may include storing routing information in a routing table on node A, where the routing information specifies that messages addressed to node C or addressed to a location-independent address associated with node C should be sent over the first link. Similarly, node B may maintain a routing table that includes routing information specifying that messages addressed to node C or addressed to a location-independent address associated with node C should be sent over the second link. Thus the message may first be sent over the first link from node A to node B, and node B may then forward the message over the second link to node C.

It is noted that the method described above for establishing links 142 among the nodes may enable the creation of efficient routes for sending messages among the nodes. Specifically, the method may enable the routing of a message sent from any given first node to any given second node to be performed with an average efficiency on the order of log(N) message hops (i.e., "O(log N)", using the order notation commonly utilized in the art), where N is the number of nodes in the plurality of nodes. (Each time a message is propagated from one node to another, a message "hop" is said to occur.)

In some embodiments of the system, the above-described method for establishing links among a plurality of nodes may also enable the system to efficiently recover from network failures or node failures. When a link between two nodes becomes invalid, e.g., because one of the nodes failed, routes that utilized that link can no longer be used to send or forward messages. In one embodiment, a node that discovers an invalid link may initiate a recovery operation to find an alternate route to the destination node.

For example, suppose that a node $D_i$ stores routing information that specifies to send messages addressed to an address R over a link to a node A. Also, suppose that node A stores routing information that specifies to send messages addressed to the address R over a link to a node B. Similarly, node B may store routing information specifying how to forward the message to yet another node, and so on, until the message eventually reaches the node (or set of nodes) with which the address R is associated.

Now suppose that node A fails. Thus, the portion of the route that maps to the link from node $D_i$ to node A and to the link from node A to node B is no longer valid. However, the portion of the route from node B onward is still valid (assuming that no other nodes or links have failed).

When node $D_i$ attempts to send the message over its route to node A and discovers that its link to node A is no longer valid, node $D_i$ may initiate a route recovery operation. In one embodiment, this may comprise broadcasting a route recovery request message from node $D_i$ over its other links that are still valid. The recovery request message may be propagated from nodes that receive the recovery message from node $D_i$ to other nodes in a cascading fashion until the recovery request message reaches the node(s) that have the address R. These nodes may then reply to the recovery request message, and the reply may be propagated backwards to eventually reach node $D_i$ via the path that the recovery request message originally traveled over. Each node that receives the reply may store routing information indicating that messages addressed to address R should be routed over the link by which the reply was received. In this manner, the route to address R may be built in a backward manner from the node that originally issued the reply until node $D_i$ finally receives the reply and stores new routing information specifying which link (i.e, the link by which node $D_i$ received the reply) to send messages over to get to the address R.

As noted above, node B still has valid routing information for address R. Thus, to build new routing information from node $D_i$ to address R, it is sufficient for the recovery request message to reach node B. Because of the manner in which the nodes are linked together as described above with reference to FIG. 5, the recovery request message may travel from node $D_i$ to node B in either one hop or two hops. Since node B is a neighbor of a neighbor of node $D_i$, node B is in the range: $D_{i-2X}, D_{i-2X+1}, \ldots D_{i-2}, D_{i+2}, D_{i+3}, \ldots D_{i+2X}$. Thus, in some cases node B is also a neighbor of node $D_i$ and the recovery request message can be sent directly from node $D_i$ to node B in a single hop. In other cases the recovery request message may arrive at node B in two hops, via another of node $D_i$'s neighbor nodes. Furthermore, even if multiple neighbors of node $D_i$ have failed, there are, in many cases, multiple two-hop paths that can be taken to reach node B. Thus, establishing links among the nodes using the method described above may allow for very efficient recovery characteristics.

For purposes of clarity, the above description refers to cases where node A is not a node randomly linked to by node $D_i$ and node B is not a node randomly linked to by node A. However, because of the redundancy established by having a node's neighbors also link to the node(s) randomly chosen by a given node, the recovery characteristics may remain efficient as described above in these cases as well.

In one embodiment, an algorithm that utilizes a "spew hops" setting may be utilized to propagate the recovery request message. In one embodiment, the number of spew hops to propagate the recovery request message may be set to 2. In another embodiment, the number of spew hops to propagate the recovery request message may be set to 3. Limiting the number of spew hops to 3 instead of 2 may enable the recovery operation to better deal with the corner cases when node B is the node $D_{i+2X}$ or $D_{i-2X}$. There is only one possible 2-hop path from node $D_i$ to these nodes. Thus if multiple nodes have failed, this path may not be available. In contrast, there are at least X 3-hop paths from node $D_i$ to node B, no matter what node B may be. Additional information regarding one embodiment of an algorithm for propagating the recovery request message is disclosed in U.S. patent application Ser. No. 10/403,557, titled, "System And Method For Sending Messages In A Computer Network", which is hereby incorporated by reference.

To further handle cases where multiple nodes have failed, the recovery algorithm may keep the remaining hop count set to 3 whenever the recovery request message is received on a node that has been explicitly marked as not having valid routing information for address R (i.e., the recovery request message may be propagated three hops from this node as well, and thus may eventually travel more than three hops from node $D_i$).

It is noted that the link creation method described above represents one particular embodiment of the method, and numerous alternative embodiments are contemplated. In particular, the general method described above may be tailored to account for various corner cases. Various alternative embodiments may still confer efficient routing and recovery properties to the system.

In some embodiments, one or more of the nodes in the plurality of nodes may establish one or more additional links other than those described above. For example, in one embodiment it may be desirable to enable all or a large proportion of the nodes in the plurality of nodes to establish links to a particular node A. As another example, in one embodiment a node B may establish links to more than X neighbor nodes in 403. In other embodiments, one or more nodes may not establish links as described above.

As discussed above, in 405, each node $D_j$ in a subset of nodes may establish a link with one or more randomly chosen nodes not in the set of nodes that $D_j$ is already linked to. In one embodiment, the subset may include each node whose position in the ordering determined in 401 is a multiple of 2X. In other embodiments, a greater or lesser proportion of the plurality of nodes may be included in the subset, and/or the nodes in the subset may be determined using other techniques. Also, in one embodiment, techniques other than random selection may be utilized to select the additional node(s) that each node $D_j$ links to. For example, each node $D_j$ in the subset may select one or more additional nodes based on the ordering determined in 401, e.g., by selecting one or more nodes that are "far away" from node $D_j$ in the ordering. For example, node $D_j$ may select a node A such that half of the other nodes fall above node $D_j$ and below node A in the ordering and the other half fall above node A and below node $D_j$ in the ordering. In another embodiment, random selection may still be utilized, but the set of nodes from which the selection is made may be restricted to a certain range, e.g., where the range is determined based on node $D_j$'s position within the ordering.

In various embodiments, links may be established at various times during operation of the system 100. Also, the links may be established in any order with respect to each other. In one embodiment, multiple nodes may simultaneously establish links to other nodes.

In one embodiment, as each node comes online in a realm, the node may perform a node discovery process to discover other nodes in the realm. Each node may contact a subset of the other nodes in the realm to establish links, e.g., where the subset of nodes is determined based on the node IDs and/or based on random selection, as described above. In one embodiment, when many nodes are coming online at once, nodes may begin to establish links before all nodes are online. Thus, for example, a node $D_i$ may select nodes $D_{i+1}$, $D_{i+2}$, ... $D_{i+X}$ based on the node IDs that node $D_i$ currently knows about, but new nodes may later come online that fall between these nodes in the ordering. When this occurs, one or more links that node $D_i$ previously established may be discarded, and new links may be established with the new nodes now online so that the desired link interconnections are eventually formed. In one embodiment, each node may be configured to accept a request to form a link with another node each time such a request is received. In other words, link connections may not be refused. Thus, when many nodes in the system are coming online, nodes may at first have many links, but after this startup period, the system may stabilize, and extra links may be discarded so that each node eventually has the desired number of links to the desired subset of other nodes. In one embodiment, an extra link may only be discarded by the node that initiated the establishment of the link. For example, if node A establishes a link to node B, then node A may later discard the link if it determines that the link should not exist, rather than node B discarding the link.

Also, even after the system has stabilized, a new node may come online, e.g., after being re-started after a failure. The new node may contact other nodes to establish links to them, as described above. Also, the other nodes may discover or may be informed of the new node, and certain nodes may discard an existing link and form a new link to the new node, e.g., if the new node is next to them in the ordering. Thus, in one embodiment the process of establishing links may be a dynamic process so that links are updated to reflect the topology of the system.

In various embodiments, the links formed as described above may be utilized to perform network communication of any kind. In one embodiment, the nodes may utilize the links to communicate with one another in a decentralized or peer-to-peer manner. As described above, in one embodiment, routes for sending messages among the nodes may be constructed as a mapping to the links, and messages may be sent over these routes. The nodes may communicate with such messages to perform any desired function or application. In one embodiment, the message communication may be utilized to perform distributed data storage. For example, storage objects may be stored on various nodes, as discussed above, and message communication may be utilized to update storage objects, move or replicate storage objects to different nodes, cache storage objects, obtain data from storage objects, etc.

In various embodiments, any of various kinds of messaging or addressing schemes may be utilized to send messages. In one embodiment, the system may utilize location-independent addresses so that messages can be sent from a sender node to one or more destination nodes without the sender node being required to know which specific nodes are the destination nodes. For example, a location-independent address may simply specify a property or entity that is associated with the destination nodes, and the message addressed to this address may be routed to each node that has the associated property or entity. One example of a location-independent address is a "role". Role-based addressing is described below.

Role-Based Addressing

Most message-based protocols require some addressing scheme to name a destination endpoint as the target of a message. IP-based protocols for example, use an IP address to name a node on a network.

According to one embodiment, message addressing is based on the concept of a "role". As used herein, a role may refer to a location-independent address for a computer network. A location-independent address may comprise information usable to address a message without specifying where the message recipient is located in the network, e.g., without specifying a particular node in the network.

The T&R layer software 130 discussed above with reference to FIG. 2 may include an interface allowing client application software to create a role on one or more nodes on a tree (more specifically, the client application software may create an instance of the role on each of the one or more nodes). Each node on which an instance of the role is created is said to have the role or host the role (or host an instance of the role). In one embodiment, each role may be identified using a string, e.g., the name of the role. In other embodiments, roles may be identified in other ways, e.g., using integers.

Thus, a complete network address for sending a message may comprise information identifying a tree and a role on the tree. For example, in one embodiment the tree may be identified using a tree ID, such as a 128-bit Universally Unique ID (UUID), and a role may be identified using a variable length string.

In another embodiment, a network address for sending a message may also include information identifying a portion of client application software to receive the message. For example, the network address may also include information identifying a protocol ID associated with a client application that utilizes the T&R layer. Multiple protocols may utilize the same tree. Thus, each message may be sent on a particular tree and, more particularly, to a particular set of nodes on the tree, i.e., the nodes having the specified role. As the message arrives to each node on the specified tree and having the specified role, the protocol ID may be used to determine which protocol on the node or which portion of client application software receives the message. In another embodiment there may not be multiple protocols, or a message may be sent without specifying a particular protocol ID. If no protocol ID is specified, the message may be delivered to all protocols bound to the tree.

Any semantic meaning associated with a role may be done so by the client application and not by the T&R layer. For example, roles such as "owner" or "instrumentation-manager" may appear to the T&R layer as just two different strings that each designate a separate target on a tree for message transfers. The T&R layer may treat client application messages simply as a set of bytes.

Sending messages to roles instead of directly to nodes may have a number of advantages. For example, a given role may be assigned to any tree vertex (node), and the role may move from node to node dynamically. Also, a single role may be assigned to multiple tree nodes. Thus, a message addressed to the role may reach each of the nodes which have the role.

Role-based addressing may also allow distributed software to run in a peer-to-peer manner. Nodes do not need to keep track of global state, such as knowing which other nodes are present on the network or which roles are bound to which nodes. A node may simply accomplish an operation by routing a message to a particular role, without needing to know which particular node or nodes have the role.

A role which is restricted to a single node is referred to herein as an exclusive role. A role which is associated with multiple nodes is referred to herein as a non-exclusive or shared role. (It is noted that a non-exclusive role may be associated with a single node.) Each instance of a shared role may have an associated role instance ID, such as a 128-bit UUID.

Each node may maintain a list of role instances which are associated with that node for each tree, i.e., a list of local role instances hosted by that node. The node may also maintain routing information that allows messages to be routed from the node to remote instances of the role, i.e., role instances associated with or hosted by other nodes. For example, the routing information may define one or more edges for the node. Each edge may be mapped to one of the node's links and may be used to route a message to one or more remote instances of a role. Each link may support many mapped tree edges. Thus, at each node along the message path from a sender node to the target node(s), the node may deliver the message to a local instance of the role (if there is one) and may forward the message to other role instances using the respective edge or edges.

In one embodiment, at each node, the routing information for a given role may include information directly specifying how to route a message to every instance of the role. For example, for each node, the node may have an edge associated with each instance of the role, where each edge points to another node to which or via which the message can be sent to the respective role instance. The role name and the instance ID for the respective instance of the role may be associated with each edge, allowing the edges to be disambiguated for shared roles.

In another embodiment, the routing information at one or more nodes may include information directly specifying how to route a message to only a subset of the role instances. Thus, if there are N instances of the role, a given node may have knowledge of less than N instances of the role. As one example, a first node may have knowledge of only a single instance of the role. For example, the first node may have an edge associated with a particular instance of the role, such that messages addressed to the role are routed to a second node to which the edge points. The second node may in turn have two or more edges, each associated with different role instances, such that messages addressed to the role and received from the first node are forwarded by the second node to multiple nodes, and continuing in this manner until each instance of the role receives the message.

The embodiment in which nodes can have routing information regarding only a subset of the role instances may allow nodes to leverage each other's knowledge. Thus, routing data may be localized, i.e., the routing data does not have to be published to every node on the tree. This may increase efficiency of the system. Allowing nodes to leverage each other's routing information may also enable recovery operations to operate more efficiently to rebuild routing information after a link failure.

One example of a technique for allowing a given node to maintain routing information for less than all N instances of a role is to utilize scoped roles. In a system employing scoped roles, each node that does not host an instance of the role must know how to reach only one node that has the role (if there is one). Each node that does host an instance of the role must be able to eventually reach all other nodes that host an instance of the role.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g., SDRAM, DDR SDRAM, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium storing program instructions executable to implement a method comprising:

determining an ordering for a plurality of N nodes such that the nodes are circularly ordered as nodes $D_0, D_1, D_2, \ldots D_{N-1}$;

each node $D_i$ in the plurality of nodes establishing a link to X other nodes chosen as nodes $D_{i+1}, D_{i+2}, \ldots D_{i+X}$, wrapping to $D_0$ if necessary; and each node $D_j$ in at least a subset of the plurality of nodes establishing a link with one or more additional chosen nodes not in the set $D_{j-X}, D_{j-X+1}, \ldots D_{j-1}, D_{j+1}, D_{j+2}, \ldots D_{j+X}$; and for each node $D_j$ in the at least the subset, each node in the set $D_{j-X}, D_{j-X+1}, \ldots D_{j-1}, D_{j+1}, D_{j+2}, \ldots D_{j+x}$ establishing a link with the one or more additional nodes chosen by the node $D_j$.

2. The computer-readable memory medium of claim 1, wherein said each node $D_j$ in the at least the subset establishing a link: with one or more additional chosen nodes not in the set $D_{j-X}, D_{j-X+1}, \ldots D_{j-1}, D_{j+1}, D_{j+2} \ldots D_{j+X}$ comprises each node $D_j$ in the at least the subset establishing a link with one or more randomly chosen nodes not in the set $D_{j-X}, D_{j-X+1}, \ldots D_{j-1}, D_{j+1}, D_{j+2}, \ldots D_{j+X}$.

3. The computer-readable memory medium of claim 2, wherein said each node $D_j$ in the at least the subset establishing a link with one or more randomly chosen nodes comprises each node $D_j$ in the at least the subset establishing a link with exactly one randomly chosen node.

4. The computer-readable memory medium of claim 1, wherein the plurality of nodes utilize the established links to communicate in a peer-to-peer manner.

5. The computer-readable memory medium of claim 1, wherein the nodes are circularly ordered so that node $D_{N-1}$ follows node $D_0$ in the ordering.

6. The computer-readable memory medium of claim 1, wherein the method implemented by the program instructions further comprises:

selecting the nodes for the at least the subset of the plurality of nodes such that the at least the subset includes nodes whose position in the ordering is a multiple of 2X.

7. The computer-readable memory medium of claim 1, wherein X is at least eighty percent smaller than N.

8. The computer-readable memory medium of claim 1, wherein each node in the plurality of nodes has a unique node ill;

wherein said determining the ordering comprises determining an ordering based on the node IDs.

9. The computer-readable memory medium of claim 8, wherein the node IDs are capable of being ordered;

wherein said determining the ordering based on the node IDs comprises ordering the node IDs;

wherein the node with the first node ID in the ordering is selected as node $D_0$, wherein the node with the second node ID in the ordering is selected as node $D_1$ and so on, up to the node with the highest node ID in the ordering being selected as node $D_{N-1}$.

10. The computer-readable memory medium of claim 1, wherein each link between two nodes comprises a virtual communication channel between the two nodes.

11. The computer-readable memory medium of claim 1, wherein the established links comprise one or more TCP links and/or one or more UDP links.

12. The computer-readable memory medium of claim 1, wherein the plurality of nodes are interconnected in a local area network (LAN).

13. The computer-readable memory medium of claim 1, wherein the method implemented by the program instructions further comprises: one or more nodes in the plurality of nodes establishing one or more additional links to one or more other nodes.

14. The computer-readable memory medium of claim 1, wherein the established links enable a message to be routed from any given first node to any given second node with an average efficiency on the order of log(N) message hops.

15. The computer-readable memory medium of claim 1, wherein the established links enable recovery operations to be performed in the event of node failures with an average efficiency on the order of 3 message hops or less.

16. A computer-readable memory medium storing program instructions executable to implement a method comprising:

determining an ordering for a plurality of N nodes such that the nodes are circularly ordered as nodes $D_0, D_1, D_2 \ldots D_{N-1}$;

each node $D_i$ in the plurality of nodes establishing a link to X other nodes chosen as $D_{i+1}, D_{i+2}, \ldots D_{i+X}$, wrapping to $D_0$ if necessary; and for each node $D_j$ in at least a subset of the plurality of nodes:

the node Dj establishing a link with one or more randomly chosen nodes not in the set $D_{j-X}, D_{j-X+1}, \ldots D_{j-1}, D_{j+1}, D_{j+2}, \ldots D_{j+X}$;

each node in the set $D_{j-x}, D_{j-X+1} \ldots D_{j-1}, D_{j+1}, D_{j+2}, \ldots D_{j+X}$ establishing a link with the one or more nodes randomly chosen by the node $D_j$.

17. A computer-readable memory medium storing program instructions executable to implement a method comprising:

determining an ordering for a plurality of nodes such that the ordering has a first node, a second node, and so on, up to a last node, wherein the ordering is circular so that the first node follows the last node in the ordering;

each node establishing one or more links to one or more nodes immediately following the node in the ordering; and for each respective node of at least a subset of the plurality of nodes, the respective node establishing one or more links to one or more randomly chosen nodes and each of the one or more nodes immediately following the respective node also establishing a link to each of the one or more nodes randomly chosen by the respective node.

18. A system comprising:

a plurality of N nodes;

wherein each node is operable to determine an ordering for the plurality of N nodes such that the nodes are circularly ordered as nodes $D_0, D_1, D_2, \ldots D_{N-1}$;

wherein each node $D_i$ in the plurality of nodes is operable to establish a link to X other nodes chosen as nodes $D_{i+1}, D_{i+2}, \ldots D_{i+X}$, wrapping to $D_0$ if necessary; and wherein each node $D_j$ in at least a subset of the plurality of nodes is operable to establish a link with one or more additional chosen nodes not in the set $D_{j-X}, D_{j-X+1} \ldots D_{j-1}, D_{j+1}, D_{j+2}, \ldots D_{j+x}$: and wherein for each node $D_j$ in the at least the subset each node in the set $D_{j-X}, D_{j-X+1}, \ldots D_{j-1}, D_{j+1}, D_{j+2}, \ldots D_{j+X}$ is operable to establish a link with the one or more additional nodes chosen by the node $D_j$.

19. The system of claim 18, wherein said each node $D_j$ in the at least the subset establishing a link with one or more additional chosen nodes not in the set $D_{j-X}, D_{j-X+1}, \ldots D_{j-X+1}, \ldots D_{j-1}, D_{j+1}, D_{j+2}, \ldots D_{j+X}$ comprises each node $D_j$ in the at least the subset establishing a link with one or more randomly chosen nodes not in the set $D_{j-X}, D_{j-X+1}, \ldots D_{j-1}, D_{j+1}, D_{j+2}, \ldots D_{j+X}$.

20. The system of claim 19, wherein said each node $D_j$ in the at least the subset establishing a link with one or more randomly chosen nodes comprises each node $D_j$ in the at least the subset establishing a link with exactly one randomly chosen node.

21. The system of claim 18, wherein the plurality of nodes are operable to utilize the established links to communicate in a peer-to-peer manner.

22. The system of claim 18, wherein the at least the subset includes nodes whose position in the ordering is a multiple of 2X.

23. The system of claim 18, wherein X is at least eighty percent smaller than N.

24. The system of claim 18, wherein each node in the plurality of nodes has a unique node ID;

wherein said determining the ordering comprises determining an ordering based on the node IDs.

25. The system of claim 18, wherein each link: between two nodes comprises a virtual communication channel between the two nodes.

26. The system of claim 18, wherein the network comprises a local area network (LAN), wherein the LAN interconnects the plurality of nodes.

27. The system of claim 18, wherein one or more nodes in the plurality of nodes are operable to establish one or more additional links to one or more other nodes.

\* \* \* \* \*